(12) United States Patent
Pursifull et al.

(10) Patent No.: US 8,370,051 B2
(45) Date of Patent: Feb. 5, 2013

(54) METHODS AND SYSTEMS FOR ASSISTED DIRECT START CONTROL

(75) Inventors: Ross Dykstra Pursifull, Dearborn, MI (US); Gopichandra Surnilla, West Bloomfield, MI (US); Donald Lewis, Howell, MI (US); Joseph Norman Ulrey, Dearborn, MI (US); John D. Russell, Portland, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 1068 days.

(21) Appl. No.: 12/348,519

(22) Filed: Jan. 5, 2009

(65) Prior Publication Data

US 2010/0174473 A1 Jul. 8, 2010

(51) Int. Cl.
*G06F 19/00* (2011.01)
*G06G 7/70* (2006.01)
*F02N 11/08* (2006.01)

(52) U.S. Cl. ..................... 701/112; 123/179.4
(58) Field of Classification Search .................. 701/112, 701/113; 123/179.1, 179.3, 179.4, 179.25, 123/179.28; 180/65.1, 65.2, 65.3, 65.4
See application file for complete search history.

(56) References Cited

U.S. PATENT DOCUMENTS

| | | | |
|---|---|---|---|
| 4,362,133 A | 12/1982 | Malik | |
| 6,161,640 A | 12/2000 | Yamaguchi | |
| 6,278,195 B1 | 8/2001 | Yamaguchi et al. | |
| 6,453,865 B2 | 9/2002 | Hirose et al. | |
| 6,556,910 B2 | 4/2003 | Suzuki et al. | |
| 6,651,603 B2 | 11/2003 | Osada et al. | |
| 6,672,267 B2 | 1/2004 | Souki et al. | |
| 6,730,000 B1 | 5/2004 | Leising et al. | |
| 6,736,755 B2 | 5/2004 | Kato | |
| 6,763,903 B2 | 7/2004 | Morimoto et al. | |
| 6,834,632 B2 | 12/2004 | Kataoka et al. | |
| 6,848,552 B2 | 2/2005 | Miller | |
| 6,857,491 B2 | 2/2005 | Wakashiro et al. | |
| 7,066,128 B2 | 6/2006 | Satake et al. | |
| 7,103,468 B2 | 9/2006 | Wakashiro et al. | |
| 7,134,414 B2 | 11/2006 | Ries-Mueller et al. | |

(Continued)

FOREIGN PATENT DOCUMENTS

| | | |
|---|---|---|
| EP | 0848159 A1 | 6/1998 |
| JP | 11082088 | 3/1999 |

(Continued)

OTHER PUBLICATIONS

Liu, et al., "Methods and Systems for Assisted Direct Start Control" U.S. Appl. No. 12/699,583, filed Feb. 3, 2010, 35 Pgs.

(Continued)

*Primary Examiner* — Stephen K Cronin
*Assistant Examiner* — Sizo Vilakazi
(74) *Attorney, Agent, or Firm* — Julia Voutyras; Alleman Hall McCoy Russell & Tuttle LLP

(57) ABSTRACT

Method and systems are provided for controlling a vehicle system including an engine that is selectively deactivated during engine idle-stop conditions. One example method comprises, adjusting a brake torque applied to a deactivated rotating engine after an engine restart request, the brake torque applied to slow the engine to at least a predetermined threshold speed without stopping the engine, and engaging a starter to the still rotating engine to increase the engine speed and restart the engine.

19 Claims, 5 Drawing Sheets

U.S. PATENT DOCUMENTS

| | | |
|---|---|---|
| 7,159,561 B1 | 1/2007 | Kerns et al. |
| 7,191,755 B2 | 3/2007 | Vint |
| 7,247,123 B2 | 7/2007 | Ohtake et al. |
| 7,275,509 B2 * | 10/2007 | Kassner .................. 123/179.25 |
| 7,305,300 B2 | 12/2007 | Gibson et al. |
| 2003/0041830 A1 * | 3/2003 | Sugiura et al. ............ 123/179.4 |
| 2003/0089326 A1 * | 5/2003 | Ujifusa ..................... 123/179.4 |
| 2003/0209373 A1 | 11/2003 | Egami et al. |
| 2006/0048734 A1 | 3/2006 | Kataoka et al. |
| 2007/0006831 A1 | 1/2007 | Leone et al. |
| 2007/0192018 A1 | 8/2007 | Gibson et al. |
| 2007/0209618 A1 | 9/2007 | Leone |
| 2007/0209619 A1 | 9/2007 | Leone |
| 2008/0262707 A1 * | 10/2008 | Yamaguchi .................. 701/112 |
| 2009/0020091 A1 | 1/2009 | Botzenhard et al. |

FOREIGN PATENT DOCUMENTS

| | | |
|---|---|---|
| JP | 2001/193540 | 1/2001 |
| JP | 2003/214210 | 4/2003 |
| JP | 2007/315316 | 12/2007 |

OTHER PUBLICATIONS

Ulrey, Joseph Norman et al., "Methods and Systems for Assisted Direct Start Control," U.S. Appl. No. 12/692,455, filed Jan. 22, 2010, 33 pages.

\* cited by examiner

METHODS AND SYSTEMS FOR ASSISTED DIRECT START CONTROL

FIELD

The present application relates to methods and systems for controlling an engine shut-down and a subsequent engine restart.

BACKGROUND AND SUMMARY

Vehicles have been developed to perform an idle-stop when idle-stop conditions are met and automatically restart the engine when restart conditions are met. Such idle-stop systems enable fuel savings, reduction in exhaust emissions, reduction in noise, and the like.

Engines may be restarted from the idle-stop condition automatically, without receiving an operator input, for example, in response to engine operating parameters falling outside a desired operating range. Alternatively, engines may be restarted from the idle-stop condition in response to a vehicle restart and/or launch request from the operator.

However, the inventors have recognized several potential issues with such a system. As one example, if a driver has a change of mind while the engine is being shut down (e.g., still spinning down) and wishes to immediately restart the engine, a desirable fast restart may not be possible. Specifically, the driver may have to wait for the engine to stop rotating completely before the engine starter can be re-engaged. As such, this may substantially increase the change of mind restart time and thus degrade the quality of the restart operation.

Thus in one example, the above issue may be addressed by a method of controlling a vehicle system including an engine that is selectively deactivated during engine idle conditions, the method comprising, adjusting a brake torque applied to a deactivated rotating engine after an engine restart request, the brake torque applied to slow the engine to at least a predetermined threshold speed without stopping the engine, and engaging a starter to the still rotating engine to increase the engine speed and restart the engine.

In one example, during the execution of an engine idle-stop operation, a driver may change their mind and request an immediate restart (e.g., by releasing a brake pedal). In response, a controller may be configured to restart the engine via a starter motor with the engine still spinning, that is, without necessitating a complete engine stop. As such, an engine starter may be configured to be engaged at engine speeds above zero, for example, at or below a predetermined threshold speed (such as at or below 50 rpm, or at or below 100 rpm). If the engine speed at the time of restart request is at or below the predetermined threshold, the starter may be immediately engaged to the still rotating engine to increase engine speed and enable an immediate restart. Alternatively, if the engine speed at the time of restart request is above the predetermined threshold, the controller may adjust a brake torque that is applied to the engine to more rapidly and forcefully slow the engine to at least the predetermined threshold starter engagement speed. Once the threshold speed is attained, the starter may be engaged to the still rotating engine to increase engine speed and restart the engine. The brake torque employed may include one or more of a reverse torque (for example, by clutching in the alternator or the AC compressor), an output shaft torque or a transmission drag torque (for example, by clutching in the transmission), a gas torque (for example, by deactivating the cylinders), or a combination thereof. By expediting engine slow-down to the starter threshold speed and engaging the starter to the still rotating engine, a rapid restart and vehicle launch may be achieved without requiring prior complete engine shut-down. However, it will be appreciated that if a prior engine full stop is desired (for example, as determined by the driver, or by the engine controller), a restart may alternatively be performed only after fully stopping the engine, but again optionally using a brake torque to rapidly slow the engine to rest.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
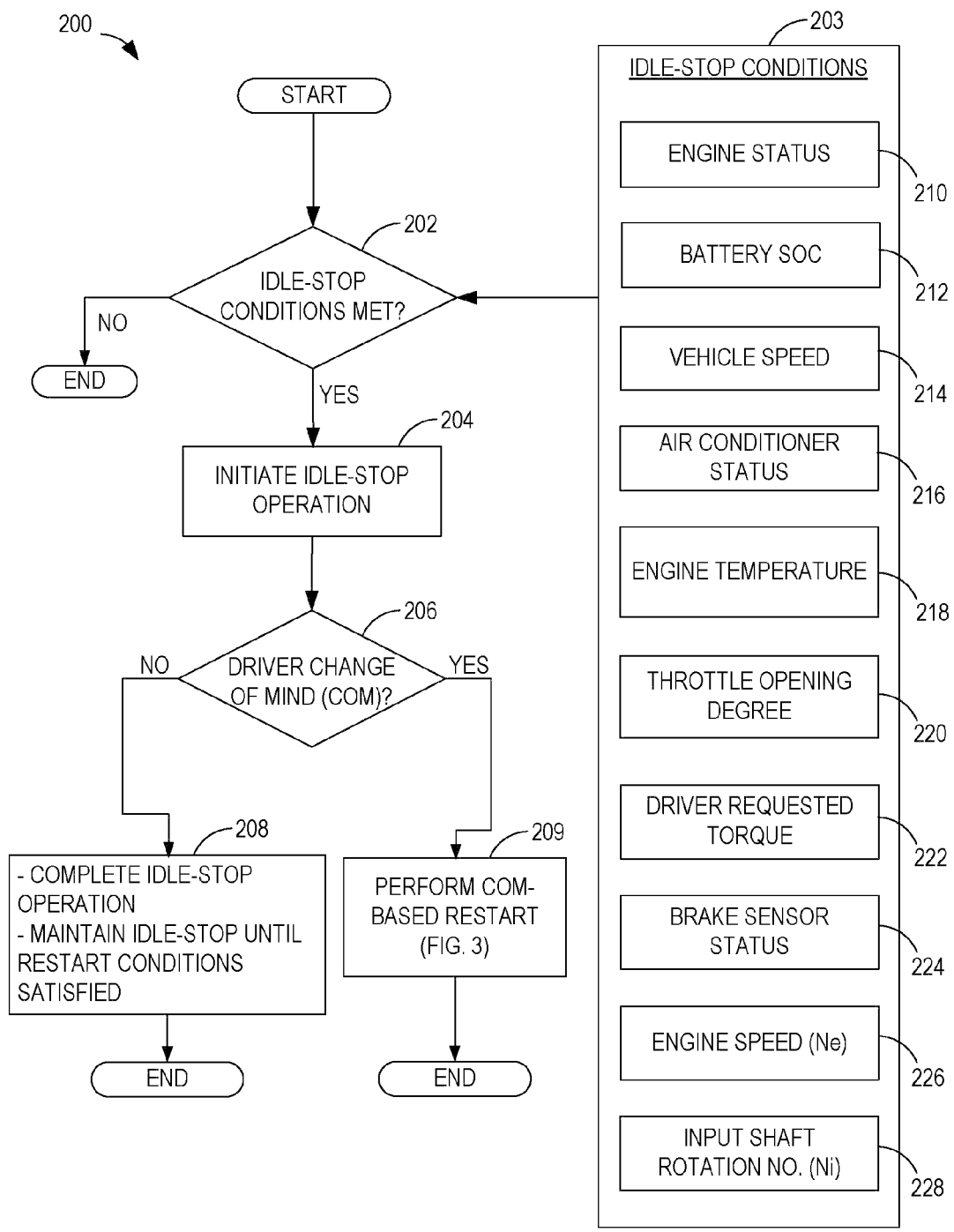
FIG. 2 shows a high level flow chart for executing an idle-stop operation.
Figure 3:
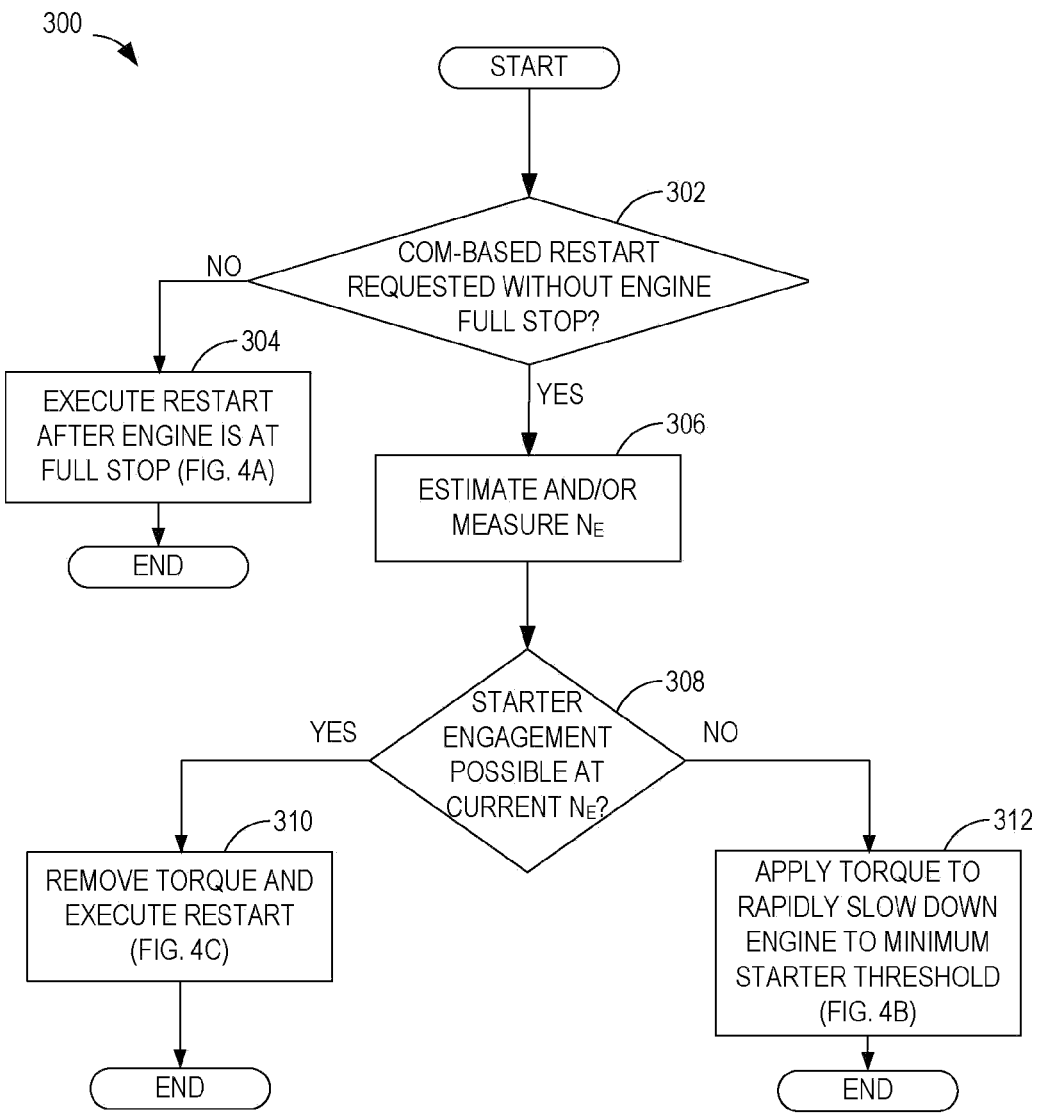
FIG. 3 shows a high level flow chart for a executing a restart operation, in response to a driver's change of mind during an idle-stop operation, according to the present disclosure.

The following description relates to systems and methods for performing an engine restart operation responsive to a driver change of mind restart request. As such, the restart request may be received during the execution of an engine idle-stop operation where the engine has not yet stopped. In response to the restart request, a controller may be configured to control operation of a variety of engine drive train and/or accessory components, such as those illustrated in FIG. 1, to thereby adjust a brake torque applied to the engine to slow the engine speed. As shown in FIGS. 2-3, the brake torque may enable engine speed to be rapidly lowered to at least a predetermined starter threshold speed wherefrom an engine starter may be engaged and an immediate vehicle restart may ensue. Specifically, once the predetermined threshold is attained, the starter may be engaged to the still rotating engine to increase engine speed and restart the engine. In this way, as further elaborated in FIGS. 4A-C, an engine may optionally be re-started without first bringing the engine to a complete stop. Furthermore, the time required for restarting an engine in response to a driver change of mind can be significantly reduced.

Figure 1:
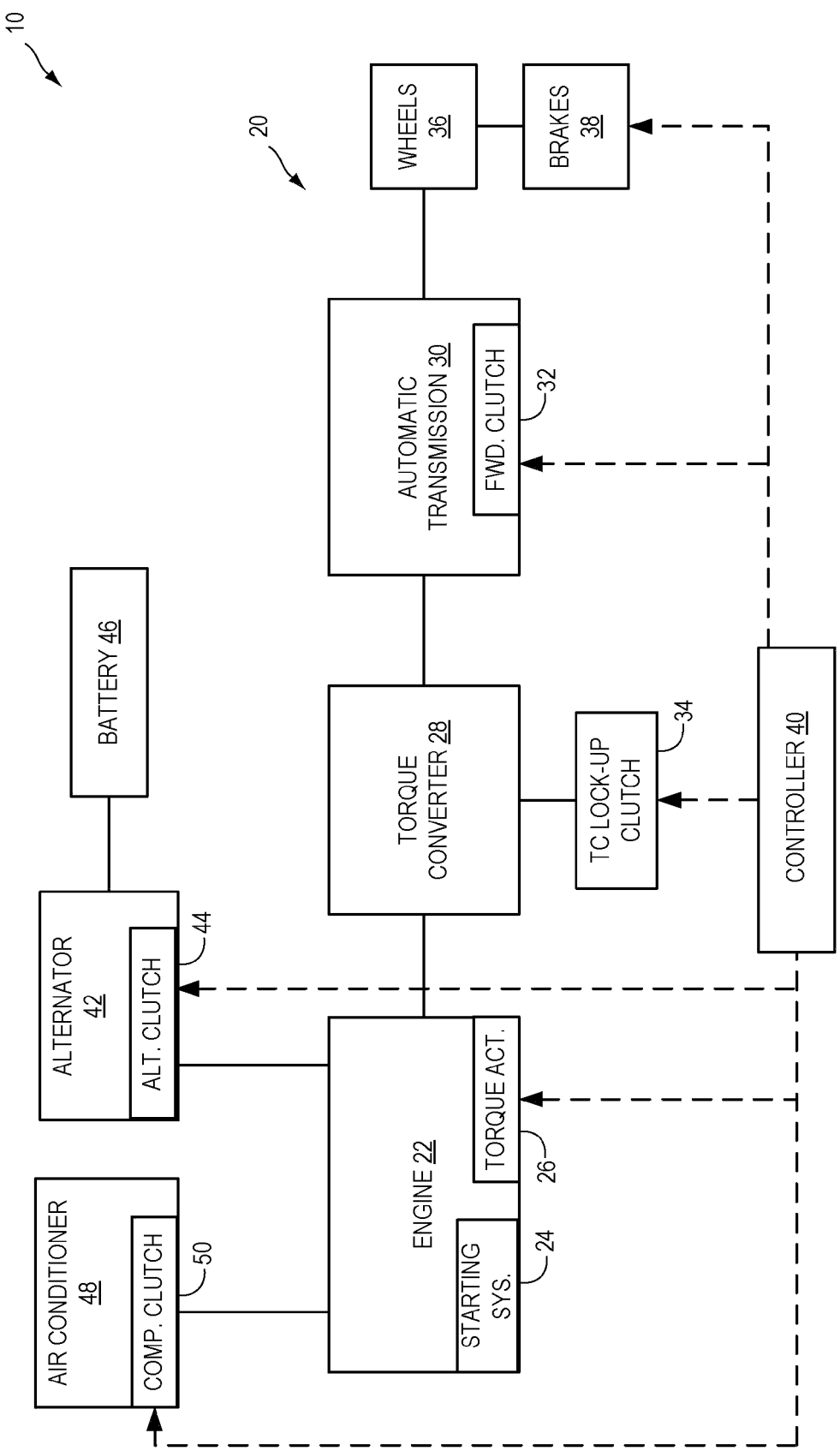
FIG. 1 shows an example vehicle system layout, including details of a vehicle drive-train.

FIG. 1 shows a block diagram layout of a vehicle system 10, including a vehicle drive-train 20. Drive-train 20 may be powered by engine 22. In one example, engine 22 may be a gasoline engine. In alternate embodiments, other engine configurations may be employed, for example a diesel engine. Engine 22 may be started with an engine starting system 24, including a starter. In one example, the starter may be a motor-driven (or battery-driven) starter. In another example, the starter may be a powertrain drive motor, such as a hybrid powerplant connected to the engine by way of a coupling device. The coupling device may include a transmission, one or more gears, and/or any other suitable coupling device. The starter may be configured to support engine restart at or below a predetermined near zero threshold speed, for example at or below 50 rpm, or 100 rpm). Alternatively, the predetermined threshold speed may be a speed range, for example 50 to 100 rpm. Further, the threshold speed (or speed range) may be adjusted responsive to operating conditions, such as engine temperature. In one example, when the engine temperature is relatively cold, the threshold speed may be adjusted to a lower value due to lower current availability and lower frictional resistance from the starter. In another example, when the engine temperature is relatively hot, the threshold speed may be adjusted to a higher value due to higher current availability and higher frictional resistance from the starter. In either case, an engine controller may adjust the threshold speed to avoid operating the engine in its resonance region. As such, the resonance region may be above the crank speed but below the idle speed. Engine 22 may further generate or adjust torque via torque actuator 26, such as a fuel injector, throttle, etc. Additionally, in the case of a hybrid vehicle, the powertrain may be used to slow or speed the engine, as desired.

An engine output torque may be transmitted to torque converter 28 to drive an automatic transmission 30 by engaging one or more clutches, including forward clutch 32, where the torque converter may be referred to as a component of the transmission. As such, a plurality of such clutches may be engaged, as needed. The output of the torque converter may in turn be controlled by torque converter lock-up clutch 34. When torque converter lock-up clutch 34 is fully disengaged, torque converter 28 transmits torque to automatic transmission 30 via fluid transfer between the torque converter turbine and torque converter impeller, thereby enabling torque multiplication. In contrast, when torque converter lock-up clutch 34 is fully engaged, the engine output torque is directly transferred via the torque converter 28 clutch to an input shaft (not shown) of transmission 30. Alternatively, the torque converter lock-up clutch 34 may be partially engaged, thereby enabling the amount of torque relayed to the transmission to be adjusted. A controller 40 may be configured to adjust the amount of torque transmitted by the torque converter by adjusting the torque converter lock-up clutch in response to various engine operating conditions, or based on a driver-based engine operation request.

Torque output from the automatic transmission 30 may in turn be relayed to wheels 36 to propel the vehicle. Specifically, automatic transmission 30 may adjust an input driving torque at the input shaft (not shown) responsive to a vehicle traveling condition before transmitting an output driving torque to the wheels.

Further, wheels 36 may be locked by engaging wheel brakes 38. In one example, wheel brakes 38 may be engaged in response to the driver pressing his foot on a brake pedal (not shown). In the same way, wheels 36 may be unlocked by disengaging wheel brakes 38 in response to the driver releasing his foot from the brake pedal.

A mechanical oil pump (not shown) may be in fluid communication with the automatic transmission 30 to provide hydraulic pressure to engage the various clutches, such as forward clutch 32 and/or torque converter lock-up clutch 34. The mechanical oil pump may be operated in accordance with torque converter 28, and may be driven by the rotation of engine 22 or the transmission input shaft, for example. Thus, the hydraulic pressure generated in the mechanical oil pump may increase as an engine speed increases, and may decrease as an engine speed decreases. An electric oil pump (not shown), also in fluid communication with the automatic transmission 30 but operating independent from the driving force of the engine 22 or transmission, may be provided to supplement the hydraulic pressure of the mechanical oil pump. The electric oil pump may be driven by a battery-driven motor (not shown).

Vehicle system components outside of the drivetrain, that is accessory components, may include an alternator 42, a battery 46 and an air conditioner 48. Alternator 42 may be configured to convert the mechanical energy generated while running engine 22 to electrical energy for storage in battery 46. Alternator 42 may include an alternator clutch 44. As such, when the alternator clutch 44 is engaged, torque output from the running engine may be relayed to alternator 42 along an alternator input shaft (not shown). However, as further elaborated herein, under certain conditions, for example when the engine is undergoing an idle-stop, controller 40 may be configured to selectively engage (at least partially) alternator clutch 44 and relay the accessory torque generated in alternator 42 to slow down engine 22. That is, the accessory torque may be used as a reverse torque.

Air conditioner (AC) 48 may include a compressor (not shown) and a compressor clutch 50. As such, when the compressor clutch 50 is engaged, torque output from the running engine may be relayed to the AC compressor, for compressing air and running the AC. However, as further elaborated herein, under certain conditions, for example when the engine is undergoing an idle-stop, controller 40 may be configured to selectively engage (at least partially) compressor clutch 50 and relay the accessory torque generated in the compressor to slow down engine 22. That is, the accessory torque may be used as a reverse torque.

Controller 40 may be configured to receive inputs from engine 22 and accordingly control a torque output of the engine and/or operation of the torque converter, transmission, brakes, alternator and/or AC. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 40 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 40 may apply a brake torque to stop the engine by controlling operation of drivetrain and/or accessory components. The applied brake torque may gradually bring the engine to a full stop. However, in some situations, during the execution of the idle-stop operation, the driver may change his mind and decide to immediately restart the engine and/or launch the vehicle. As such, the starter may not be engageable unless the engine speed is at or below the predetermined starter threshold speed (which may depend on various factors such as temperature, etc.). Furthermore, the engine controller may delay restarting the engine until the engine speed is out of a resonance region, which may be a range of engine speeds. If the engine speed at the time of change of mind (COM) restart request is at or below the threshold speed, controller 40 may immediately engage the starter to the spinning engine to increase engine speed and restart the engine. However, if the engine speed at the time of restart request is above the threshold speed, controller 40 may adjust operation of drivetrain and/or accessory components to adjust the brake torque to the engine to thereby rapidly and deliberately reduce the engine speed to at least the threshold speed. After the threshold speed is attained, the starter may be engaged to the rotating engine and a restart may be achieved. Herein, the engine speed may be substantially immediately (and not gradually) reduced to the threshold speed to expedite engine restart.

In one example, adjusting the brake torque applied to the engine to expedite engine slow-down may include increasing the brake torque applied to the engine. This may be desirable when the difference between the engine speed at the time of restart request and the predetermined threshold speed is relatively larger. Herein, by increasing the brake torque, the engine speed may be immediately reduced without adversely affecting engine components. In another example, adjusting the brake torque applied to the engine to expedite engine slow-down may include decreasing the brake torque applied to the engine. This may be desirable when the difference between the engine speed at the time of restart request and the predetermined threshold speed is relatively smaller. Herein, a further increase in the brake torque may adversely affect engine components, such as drivetrain components, and degrade engine performance. Thus, by decreasing the brake torque, the engine speed may be rapidly reduced to the threshold speed without affecting vehicle performance.

As such, the brake torque applied to the engine may include one or more of a reverse torque, a transmission drag torque, and a gas torque. In one example, applying a reverse torque to brake engine speed may include engaging a clutch of the alternator clutch and/or engaging a clutch of the air conditioner compressor. In another example, if the vehicle is equipped with an accessory shaft-to-heat device (such as a shear generating device or a coulomb torque device), clutching in of the device may optionally or additionally be employed to enable a fast and smooth engine spin-down. Herein, the heat may be transferred to the engine oil or the engine coolant.

When applying a transmission drag torque to brake engine speed, at least one transmission hydraulic component, such as a forward clutch of the transmission and/or a torque converter clutch, may be engaged with the transmission in an engaged gear, such as a first gear. In one example, the torque converter can be used to transmit a drag torque generated by the stopped vehicle wheels through the gears of the transmission via the transmission forward clutch. In other words, an in-gear transmission may be used to apply a braking drag torque on the engine, wherein the amount of torque applied can be modulated via slipping of a transmission clutch, such as the forward clutch and/or torque converter clutch. In another example, a larger drag torque can be generated by increasing engagement of at least one (or both) of the torque converter clutch and the transmission forward clutch. For example, if the transmission forward clutch and torque converter clutch were fully engaged, and the wheels were held fixed to the ground via friction and/or the wheel brakes, then a maximum drag torque can be applied to the engine (assuming the wheels do not break free from the ground). Similarly, the drag torque can be reduced by increasing the slip of at least one or both of the torque converter clutch and transmission forward clutch. As such, by using a transmission drag torque to expedite engine spin-down, a controller may also be able to limit the engine's tendency to pump oxidant through the catalyst (of the emission control device) and thereby limit the amount of reductant subsequently required to return to the desired operating condition.

Thus, in one example, controller 40 may maintain forward clutch 32 in an engaged state, at least during the engine spin-down, and may start to engage torque converter lock-up clutch 34 (if it is not already engaged) to thereby allow an increased external frictional (drag) torque to be applied. In this example, the level of engagement of the torque converter lock-up clutch (that is, whether the clutch is fully engaged, or partially engaged) may be adjusted in response to the desired spin-down time to thereby adjust the level of the drag torque responsive to the engine speed and thereby control the spin-down of the engine. Alternatively, the controller 40 may maintain the engagement state of the torque converter lock-up clutch 34 at a fixed value and modulate the engagement state of the automatic transmission forward clutch 32 by adjusting the hydraulic pressure supplied to the forward clutch. Alternatively still, controller 40 may modulate the engagement state of both the torque converter lock-up clutch as well as the forward clutch to thereby adjust the drag torque applied to reduce the engine speed to zero. Controller 40 may select between the possible alternatives based on engine operating conditions, clutch conditions (for example, the wear and tear level of forward clutch 32 and torque converter lock-up clutch 34), the response time desired for engine spin-down, etc.

Engine spin-down may also be expedited by applying a gas torque as a braking torque to the engine via cylinder deactivation mechanisms. In one example, at least an intake valve of the designated cylinder(s) may be closed while leaving the exhaust valves open. The substantially zero air flow and the lack of gas in the cylinder forcefully reverses the engine, enabling a rapid engine spin-down without causing degraded noise, vibration and harshness (NVH). In another example, ignition timing (that is, spark timing) may be advanced (for example, over-advanced). Specifically, controller 40 may wait for manifold pressure (MAP) to fall, due to throttle shuttling, below a predetermined threshold, and then adjust the intake valve timing to a maximally late intake valve closure (to thereby compress as little as possible). Subsequently, spark timing may be advanced to a time significantly before MBT (e.g., peak torque spark timing for the current engine conditions) to enable rapid engine speed reversal. As such, use of spark timing advance may be selected at light engine loads.

It will be appreciated that, in still other examples, controller 40 may be configured to employ any combination of reverse torque, transmission drag torque, and gas torque to adjust the braking torque and expedite engine slow down to the predetermined starter speed threshold in response to the driver change of mind restart request. Controller 40 may select between the possible alternatives based on engine operating conditions, clutch conditions (for example, the wear and tear level of the different clutches), the response time desired for engine spin-down, etc.

Now turning to FIG. 2, a routine 200 is described for performing an idle-stop operation in the vehicle system of FIG. 1. At 202, it is confirmed if idle-stop conditions 203 have been met. Any or all of the idle-stop conditions 203, as further described herein, may be met for an idle-stop condition to be confirmed. For example, at 210, the engine status may be determined. Herein it may be verified that the engine is operating (e.g., carrying out combustion). At 212, the battery state of charge may be determined. In one example, if the battery state of charge is more than 30%, it may be determined that an engine idle-stop may proceed and that recharge may not be required. At 214, it may be verified that the vehicle running speed is within a desired range. In one example, the desired range may be no more than 30 mph. At 216, an air-conditioner status may be assessed and it may be verified that the air conditioner did not issue a request for restarting the engine, as may be requested if air conditioning is desired. At 218, the engine temperature may be estimated and/or measured to determine if it is within a selected temperature range. In one example, the engine temperature may be inferred from an engine coolant temperature and an engine idle-stop condition may be selected when the engine coolant temperature is above a predetermined threshold. At 220, a throttle opening degree may be determined using a throttle opening degree sensor. In one example, the sensor reading may be used to verify that a start has not been requested by the vehicle driver. At 222, the driver requested torque may be estimated to confirm that it is less than a predetermined threshold value. At 224, a brake sensor status may be read. In one example, the brake sensor may read the status of the brake pedal and verify that the brake pedal has been pressed. At 226, the engine speed may be determined. At 228, the input shaft rotation number (Ni) may be determined.

If idle-stop conditions are not met, the routine may end. However, if any or all of the idle-stop conditions are met, then at 204, the controller may initiate execution of the idle-stop operation and proceed to deactivate the engine. As such, this may include shutting off fuel and/or spark to the engine. While the idle-stop operation is under way, at 206, it may be determined whether a driver change of mind (COM) has occurred or not. That is, it is determined whether the driver has decided to discontinue the engine idle-stop operation (e.g., via release of the wheel brakes) and restart the engine instead. If no driver COM is determined, then at 208, controller 40 may proceed to complete the idle-stop operation started at 204, following which, the engine may be maintained in idle-stop until restart conditions are satisfied.

If a driver COM is determined at 206, a COM-based restart may be performed at 209. Herein, as further elaborated with reference to FIG. 3, it may be determined whether an engine restart is desired with the engine still, or whether the restart is desired after fully stopping the engine. Accordingly, and further based on the present engine speed, a braking torque may be applied and adjusted to expedite engine slow-down to a threshold speed, wherefrom a starter may be engaged and a rapid engine restart may be achieved.

Now turning to FIG. 3, a routine 300 is described for performing a COM-based engine restart operation in the vehicle system of FIG. 1. As such, the COM-based restart request may be received during the previous idle-stop operation and while the engine is not yet stopped. That is, the engine may be deactivated (with fuel injection and/or sparking shut off), but still rotating. At 302, it is confirmed whether a COM-based restart without an engine full stop has been requested. That is, it is determined whether a restart is desired while the engine is still spinning. During a first restart condition where no COM-based restart with full engine stop is requested, at 304 (and as further depicted in FIG. 4A), the routine may proceed to apply a brake torque to the engine, wait for the engine to fully stop, engage a starter to the stopped engine and restart the engine. Herein, an immediate restart may not be attainable. A controller may select the COM-based restart with engine full stop based on starter motor conditions, battery state of charge, etc.

If a COM-based restart without engine full stop is requested, at 306, the engine speed ($N_e$) may be measured and/or estimated. At 308, it is determined whether the engine starter may be engaged (and hence a restart operation may be possible) at the estimated engine speed. Specifically, it is determined if the engine speed is at or below the predetermined starter threshold speed (for example, at or below 50 or 100 rpm). Alternatively, it may be determined whether the engine speed is within the predefined threshold speed range (for example, within 50 to 100 rpm). As such, the engine starter may not be engaged at engine speeds above the threshold speed (or speed range).

Thus, during a second restart condition wherein the engine speed at the time of restart request is above the predetermined threshold, and it is determined that starter engagement is not possible at the current engine speed, at 312, the engine controller may adjust the brake torque applied to the engine to rapidly and deliberately slow the engine to at least the predetermined threshold speed. Once the predetermined threshold speed is attained, the starter may be engaged to the still rotating engine to increase engine speed and perform a restart operation. That is, after the starter has been engaged, engine fuel and spark may be reactivated. As previously elaborated, the brake torque may be adjusted by controlling operation of a variety of vehicle drivetrain and accessory components to thereby adjust a combination of a reverse torque, a transmission drag torque, and/or a gas torque. Specifically, the controller may adjust operation of a variety of transmission clutches, such as a forward clutch and a torque converter lock-up clutch, to apply a transmission drag torque and/or adjust operation of an alternator clutch and/or an AC compressor clutch, to apply a reverse torque. Further still, the controller may adjust cylinder deactivation mechanisms, such as by controlling operation of cylinder intake valves and/or spark timing, to apply a gas torque to expedite engine slow-down. In this way, using a combination of torques to apply a brake torque, engine speed may be deliberately and swiftly reduced to a starter threshold speed wherefrom the starter may be re-engaged for a rapid engine restart. Such an operation is depicted below with reference to FIG. 4B.

During a third restart condition wherein the engine speed at the time of restart request is at or below the predetermined threshold, and it is determined that starter engagement is possible at the current engine speed, at 310, the brake torque may be removed and the starter may be engaged to the still rotating engine to increase engine speed and execute a restart. That is, after the starter has been engaged, engine fuel and spark may be reactivated. Such an operation is also depicted below with reference to FIG. 4C.

In this way, an expedited restart may be achieved in response to a driver change of mind restart request received in the midst of an idle-stop operation and where the engine is not yet stopped. By adjusting a brake torque applied to the engine to deliberately slow engine speed to a starter threshold, a change of mind restart request time can be substantially reduced.

Figure 4A:
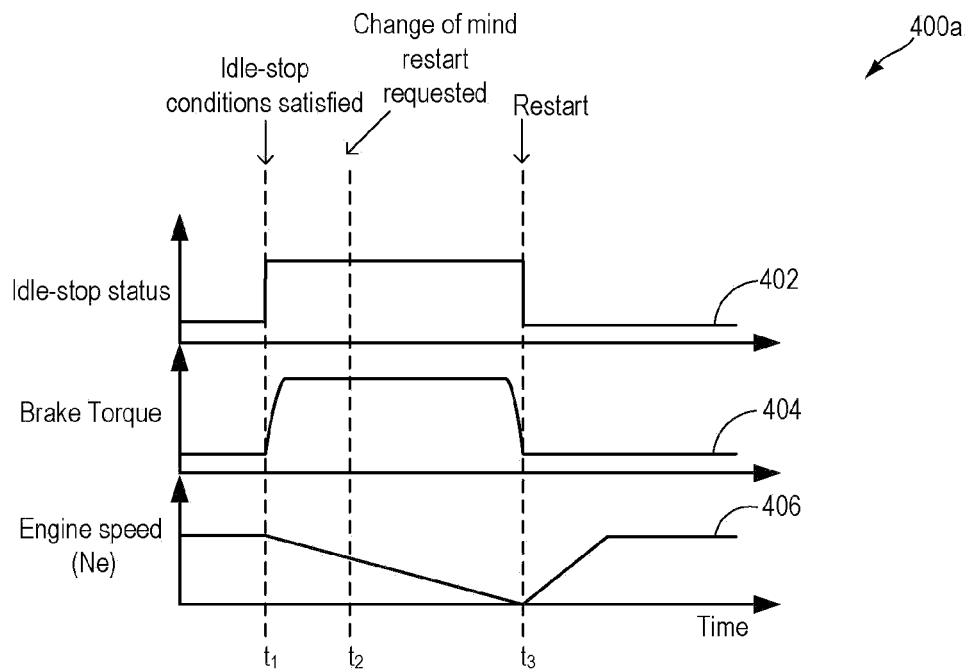
FIGS. 4A-C shows maps with a plurality of graphs explaining example engine restart procedures in response to a driver change of mind, according to the present disclosure.
Figure 4B:
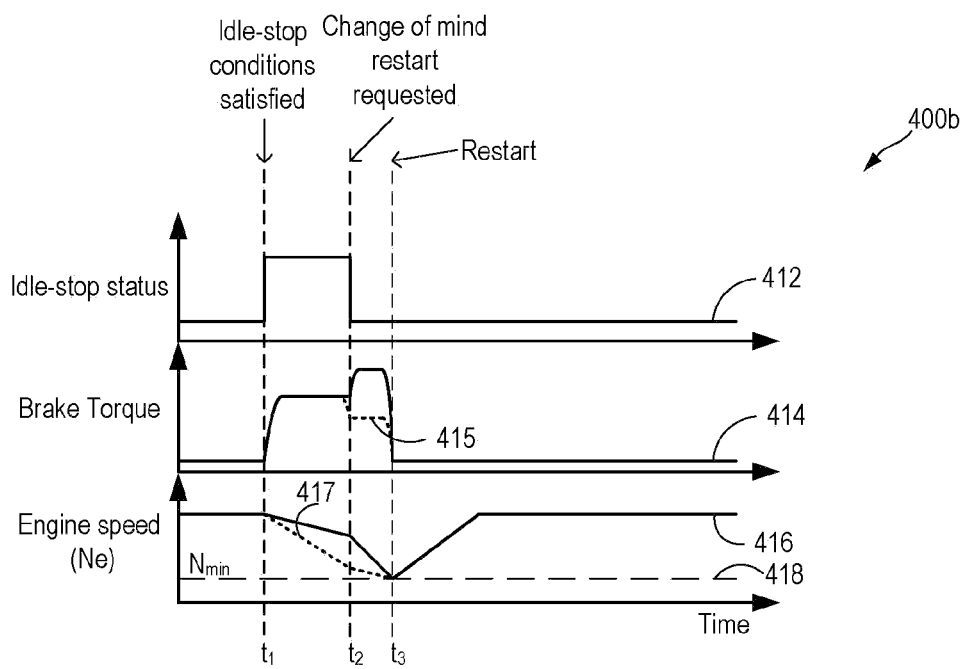
Figure 4C:
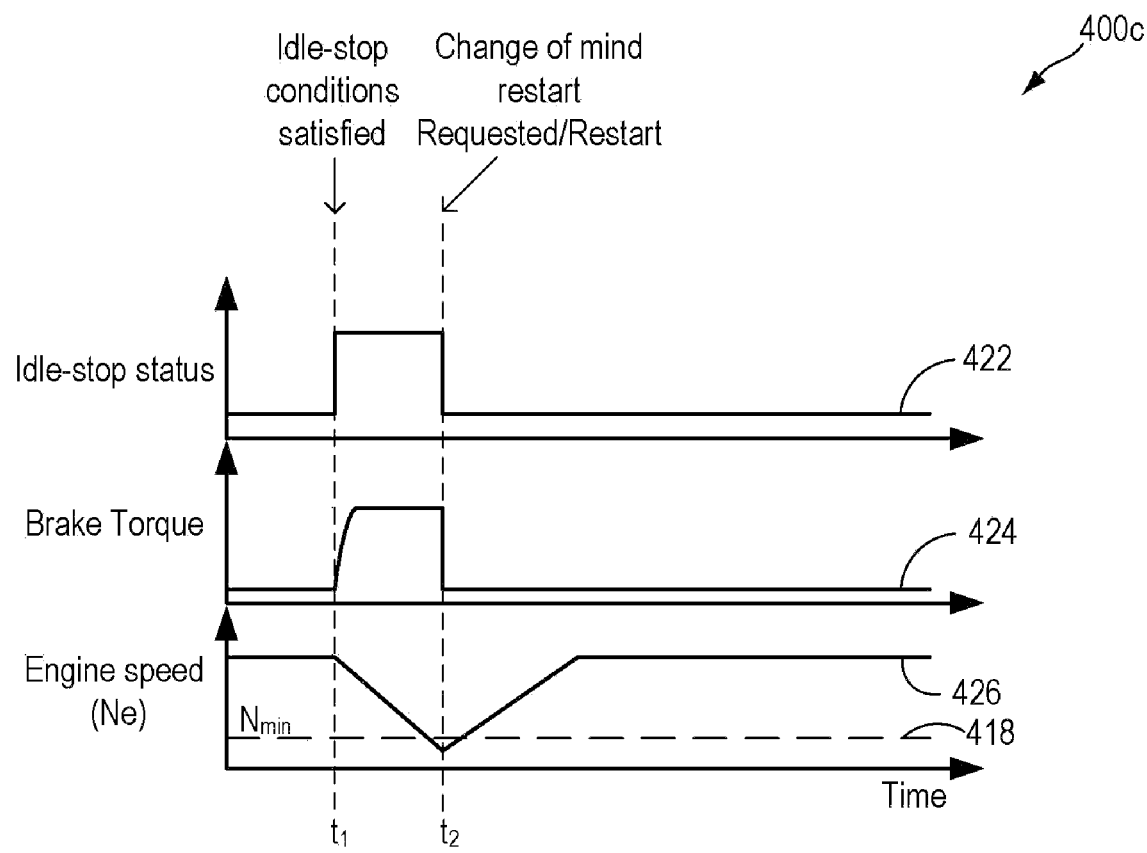

FIGS. 4A-C depict maps 400a-c with a plurality of graphs depicting example shutdown and restart scenarios for further explaining the various COM-based restart operations (as discussed in FIG. 3) of the present disclosure.

FIG. 4A depicts a COM-based restart operation with engine full stop. In FIG. 4A, map 400a shows an indication of idle-stop status in first graph 402. Second graph 404 depicts the brake torque applied to the engine. As such, this may represent any combination of reverse torque, transmission drag torque, and gas torque, applied to the engine. Third graph 406 represents variations in engine speed ($N_e$) during the depicted idle-stop or restart operations.

Herein, at $t_1$, and as indicated by graph 402, an idle-stop request may be confirmed (for example, by confirming idle-stop conditions) and an idle-stop operation may be initiated. Accordingly, as indicated by graph 404, a brake torque may be applied on the engine to enable engine spin-down. The brake torque may be applied until an engine full stop is attained. As such, before idle-stop conditions are confirmed, that is before $t_1$, engine speed (as depicted by graph 406) may be at a high value. Upon application of the brake torque between $t_1$ and $t_3$, engine speed may be gradually reduced, until engine full stop is attained at $t_3$.

A driver change of mind (COM) restart request may be received during the idle-stop operation and while the engine is spinning down at $t_2$. Herein, since the restart is requested with engine full stop, an immediate engine restart may not be achievable. That is, a restart operation may only be initiated at $t_3$. As such, this may increase the COM restart time (for example, by more than 150 ms) when compared to restart operations not requiring a complete engine stop (as further elaborated in FIGS. 4B-C).

In FIG. 4B, map 400b depicts a COM-based restart operation wherein engine speed at an occurrence of restart request is above a predetermined starter threshold speed. An indication of idle-stop status is provided in first graph 412. Second graph 414 depicts the brake torque applied to the engine while graph 416 represents variations in engine speed ($N_e$) during the depicted idle-stop or restart operations.

As indicated in graph 412, an idle-stop operation may be initiated at $t_1$. As indicated by graph 414, a brake torque may be immediately applied on the engine to enable rapid engine spin-down. Consequently, a gradual reduction in engine speed (graph 416) may ensue. During the idle-stop operation, and while the engine is still spinning, at $t_2$, a change of mind (COM) restart request may be received. A controller may determine whether the engine speed at the time of restart request is above or below a predetermined threshold speed ($N_{min}$, dashed line 418) and accordingly apply the brake torque. In one example, as indicated by graph 416, the difference between engine speed at the time of restart request ($t_2$) and the predetermined threshold speed ($N_{min}$) may be relatively large. Accordingly, the brake torque applied to the engine (graph 414, solid line) may be increased (between $t_2$ and $t_3$) to expedite engine slow down (graph 416) to the threshold speed. Once the threshold speed is attained ($t_3$), an engine restart operation may be executed.

In another example, as indicated by dotted segment 417, the difference between engine speed at the time of restart request ($t_2$) and the predetermined threshold speed ($N_{min}$) may be relatively small. Herein, a further increase in brake torque may degrade engine performance and affect engine components. Accordingly, the brake torque applied to the engine (dotted segment 415) may be decreased (between $t_2$ and $t_3$) to expedite engine deceleration (dotted segment 417) to the threshold speed. After the threshold speed is attained ($t_3$), an engine restart procedure may be executed. In this way, the COM restart time may be substantially reduced and brought within a desirable range (for example, within 300 ms).

FIG. 4C depicts a COM-based restart operation wherein engine speed at an occurrence of restart request is below the predetermined starter threshold speed. An indication of the idle-stop status is provided in first graph 422. Second graph 424 depicts the net torque applied to the engine while graph 426 represents variations in engine speed ($N_e$) during the depicted idle-stop or restart operations.

As indicated by graph 422, an idle-stop operation may be initiated at $t_1$. As indicated by graph 424, a brake torque may be immediately applied to the engine. In response, a gradual reduction in engine speed, as shown by graph 426, may ensue. During the idle-stop operation, and while the engine is still spinning, at $t_2$, a change of mind (COM) restart request may be received. A controller may determine that the engine speed (as indicated by graph 426) at the time of restart request ($t_2$) is at or below the predetermined threshold speed ($N_{min}$, dashed line 418). Since the starter may be engaged at this speed, the brake torque may be immediately removed. That is, a restart operation may be immediately initiated at $t_2$, as indicated by a subsequent gradual increase in engine speed (graph 426).

In this way, a change of mind based engine restart may be executed without requiring that the engine reach zero engine speed, if so desired. By expediting engine deceleration to a threshold speed wherefrom a starter can be immediately engaged, a rapid restart and vehicle launch may be enabled. In doing so, change of mind restart times may be substantially reduced.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a vehicle system including an engine that is selectively deactivated during engine idle conditions, comprising:
    adjusting a brake torque applied to a deactivated rotating engine via a clutch after an engine restart request, the brake torque applied to slow the engine to a predetermined threshold speed without stopping the engine; and
    engaging a starter to the still rotating engine to increase engine speed and restart the engine.

2. The method of claim 1 wherein the starter is engaged at a predetermined engine speed.

3. The method of claim 2 wherein the predetermined engine speed varies as engine operating conditions vary.

4. The method of claim 1 wherein engine fuel and spark are reactivated to start the engine after the starter is engaged.

5. The method of claim 3 wherein engine operating conditions include engine temperature.

6. A method of controlling a vehicle system including an engine that is selectively shut-down during engine idle-stop conditions, the method comprising:
    receiving an engine restart request from an operator during an engine idle-stop operation where the engine is not yet stopped;

adjusting a brake torque applied to the engine in response to the engine restart request, the brake torque applied to slow the engine to at least a predetermined threshold speed, including increasing the brake torque applied to the engine in response to a first difference between engine speed at a time of restart request and the predetermined threshold speed, and decreasing the brake torque applied to the engine in response to a second difference between engine speed at the time of restart request and the predetermined threshold speed is relatively smaller, the first difference larger than the second difference; and once the at least a predetermined threshold speed is attained, engaging a starter to the still rotating engine to increase engine speed and restart the engine.

7. The method of claim 6 wherein the brake torque applied to the engine includes applying one or more of a reverse torque, a transmission drag torque, and a gas torque.

8. The method of claim 7 wherein applying the reverse torque to the engine includes engaging a clutch of an alternator and/or engaging a clutch of an air conditioner compressor.

9. The method of claim 7 wherein applying the transmission drag torque to the engine includes engaging at least one transmission hydraulic component with a transmission in an engaged gear.

10. The method of claim 9 wherein the at least one transmission hydraulic component includes a forward clutch of the transmission and/or a torque converter clutch.

11. The method of claim 7 wherein applying the gas torque includes at least one of closing at least an intake valve of a cylinder while leaving an exhaust valve open, adjusting intake valve timing to a late intake valve closure, and advancing spark timing.

12. The method of claim 6 wherein the predetermined threshold speed is less than 100 rpm.

13. The method of claim 6 wherein the predetermined threshold speed is a speed range of 50-100 rpm.

14. A method of expediting engine spin-down in an engine that is shut-down during engine idle-stop conditions and restarted during restart conditions, the method comprising:

when an engine restart request is received from an operator during an engine idle-stop operation and where the engine is not yet stopped;

during a first restart condition, applying a brake torque to the engine, fully stopping the engine, and then engaging a starter to the stopped engine to increase engine speed and restart the engine;

during a second restart condition wherein engine speed at an occurrence of a restart request is above a predetermined threshold, applying the brake torque to the engine to slow the engine to at least a predetermined threshold speed, and after the at least a predetermined threshold speed is attained, engaging the starter to the still rotating engine to increase engine speed and restart the engine; and during a third restart condition wherein the engine speed at the occurrence of the restart request is at or below the predetermined threshold, removing the brake torque applied to the engine and engaging the starter to the still rotating engine to increase engine speed and restart the engine.

15. The method of claim 14 wherein the brake torque includes one or more of a reverse torque, a transmission drag torque, and a gas torque.

16. The method of claim 15 wherein the reverse torque is achieved by engaging a clutch of an alternator and/or engaging a clutch of an air conditioner compressor, the transmission drag torque is achieved by engaging at least one of a forward clutch and a torque converter clutch of a transmission, and the gas torque is achieved by at least one of closing an intake valve of a cylinder while leaving an exhaust valve open, adjusting intake valve timing to a late intake valve closure, and advancing spark timing.

17. The method of claim 14 wherein the predetermined threshold speed is below 100 rpm.

18. The method of claim 14 wherein the predetermined threshold speed is a speed range of 50-100 rpm.

19. The method of claim 14 wherein applying the brake torque to the engine includes, increasing the brake torque applied to the engine when a difference between engine speed at the occurrence of the restart request and the predetermined threshold speed is relatively larger; and decreasing the brake torque applied to the engine when the difference between engine speed at the occurrence of the restart request and the predetermined threshold speed is relatively smaller.

\* \* \* \* \*